United States Patent
Wang

(10) Patent No.: US 9,420,588 B2
(45) Date of Patent: Aug. 16, 2016

(54) WLAN PACKET-BY-PACKET BANDWIDTH SCHEDULING FOR LTE COEXISTENCE

(71) Applicant: QUALCOMM Incorporated, San Diego, CA (US)

(72) Inventor: Jibing Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 79 days.

(21) Appl. No.: 14/446,970

(22) Filed: Jul. 30, 2014

(65) Prior Publication Data

US 2016/0037520 A1 Feb. 4, 2016

(51) Int. Cl.
*H04W 4/00* (2009.01)
*H04W 72/04* (2009.01)
*H04W 84/12* (2009.01)
*H04W 72/08* (2009.01)
*H04W 72/12* (2009.01)

(52) U.S. Cl.
CPC ...... *H04W 72/0453* (2013.01); *H04W 72/0413* (2013.01); *H04W 72/082* (2013.01); *H04W 84/12* (2013.01); *H04W 72/1215* (2013.01)

(58) Field of Classification Search
CPC .................................................. H04W 72/005
USPC ......................................................... 370/329
See application file for complete search history.

(56) References Cited

U.S. PATENT DOCUMENTS

| | | | |
|---|---|---|---|
| 2011/0249554 A1* | 10/2011 | Chamas ................ | H04L 47/525 370/230 |
| 2012/0184327 A1* | 7/2012 | Love .................... | H04B 1/0064 455/552.1 |
| 2013/0182655 A1 | 7/2013 | Das et al. | |
| 2013/0196673 A1 | 8/2013 | Smadi et al. | |
| 2014/0031031 A1* | 1/2014 | Gauvreau ............. | H04L 5/0053 455/426.1 |
| 2014/0050146 A1 | 2/2014 | Chrisikos et al. | |
| 2014/0056276 A1 | 2/2014 | Behnamfar et al. | |
| 2014/0056277 A1 | 2/2014 | HomChaudhuri et al. | |

FOREIGN PATENT DOCUMENTS

GB 2504758 A 2/2014

OTHER PUBLICATIONS

ISA/EPO, International Search Report and Written Opinion of the International Searching Authority, Int'l. App. No. PCT/US2015/041094, Sep. 30, 2015, European Patent Office, Rijswijk, NL, 12 pgs.

* cited by examiner

*Primary Examiner* — Shripal Khajuria
(74) *Attorney, Agent, or Firm* — Holland & Hart LLP

(57) ABSTRACT

The use of multiple radios using different radio access technologies (RATs) on a wireless station can result in interference that can be mitigated by reducing, on a packet-by-packet basis, the bandwidths of communications using one of the RATs. For example, the bandwidth of wireless local area network (WLAN) communications sent or received by a wireless station can be reduced in order to avoid interference with Long-term Evolution (LTE) or LTE-Advanced (LTE-A) communications. A wireless station can determine that only a portion of an interfering bandwidth used by a first radio will interfere with the receipt of communications on a second radio, then the wireless station can dynamically adjust its transmissions on the first radio to only use non-interfering frequencies.

25 Claims, 14 Drawing Sheets

WLAN PACKET-BY-PACKET BANDWIDTH SCHEDULING FOR LTE COEXISTENCE

BACKGROUND

1. Field of the Disclosure

The present disclosure relates to wireless communication systems, and more particularly to wireless stations that include multiple radios for communicating on different radio access technologies (RATs).

2. Description of Related Art

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems. These are examples of different categories of radio access technology.

One example of a RAT implemented by a wireless network is a Wireless Local Area Network (WLAN) such as a Wi-Fi network (IEEE 802.11). A WLAN may include an access point (AP) that may communicate with stations (STAs) or mobile devices. The AP may be coupled to a network, such as the Internet, and enable a wireless station to communicate via the network (and/or communicate with other devices coupled to the access point).

Another example of a RAT implemented by a wireless network is a long-term evolution (LTE) network or an LTE-Advanced (LTE-A) network. In an LTE/LTE-A network, a number of base stations may be included, each simultaneously supporting communication for multiple communication devices, otherwise known as user equipments (UEs). A base station may communicate with UEs on downlink channels (e.g., for transmissions from a base station to a UE) and uplink channels (e.g., for transmissions from a UE to a base station).

A wireless station or a UE may include multiple radios such that the wireless station or UE is able to communicate on different networks using different RATs. For example, a wireless station or UE may include radios for communication over both a WLAN and a LTE/LTE-A network. The wireless station or UE may communicate over other types of networks as well. However, having multiple radios on the same device may result in interference between the two radios, leading to a decrease in device performance on at least one of the networks.

SUMMARY

When a user device includes multiple radios, interference may result from the simultaneous use of the multiple radios. For example, transmission on frequencies used by a user device on a WLAN can cause interference to the user device's simultaneous receipt of communications over an LTE/LTE-A network. Similarly, transmission on frequencies used by a user device on an LTE/LTE-A network can cause interference to the user device's simultaneous receipt of communications over a WLAN. The resulting interference, however, may arise from use of only a portion of the interfering bandwidth. Thus, if a user device can determine that only a portion of an interfering bandwidth used by a first radio will interfere with the receipt of communications on a second radio, then the user device can dynamically adjust its transmissions on the first radio to only use non-interfering frequencies. The dynamic adjustment can be on a packet-by-packet basis.

In some embodiments, a method of wireless communication is disclosed. The method may include identifying at least one frequency allocated to a first radio access technology (RAT) during a specified time. The method may also include identifying at least one interfering frequency in a bandwidth utilized by a second RAT, the interfering frequency determined based on the frequency allocated to the first RAT during the specified time, and the second RAT being different from the first RAT. The method may also include reducing the bandwidth utilized by the second RAT during the specified time based at least in part on the interfering frequency.

In one aspect, the first RAT may be a Long Term Evolution (LTE) RAT, and the second RAT may be a Wireless Local Area Network (WLAN) RAT. The frequency allocated to the first RAT during the specified time may be utilized for an LTE uplink. The method may further include receiving LTE uplink scheduling information. The second RAT may transmit at least one packet over the reduced bandwidth during the specified time. The interfering frequency may desensitize an LTE downlink of the first RAT.

In another aspect, the bandwidth utilized by the second RAT may include predefined bandwidth increments. The method may further include determining at least one predefined bandwidth increment that includes the interfering frequency, and reducing the bandwidth utilized by the second RAT by disabling utilization of the predefined bandwidth increment that includes the interfering frequency. The predefined bandwidth increments may include 20, 40, 80, and 160 MHz bandwidth increments.

In yet another aspect, the method may further include transmitting interfering frequency information to an access point based at least in part on the determined interfering frequency. The method may also include receiving a transmission from the access point during the specified time, the transmission utilizing a reduced bandwidth determined by the interfering frequency information.

In another embodiment, an apparatus for wireless communication is disclosed. The apparatus may include an interference identifier to identify at least one frequency allocated to a first radio access technology (RAT) during a specified time, and to identify at least one interfering frequency in a bandwidth utilized by a second RAT, the interfering frequency determined based on the frequency allocated to the first RAT during the specified time, and the second RAT being different from the first RAT. The apparatus may also include an interference mitigator to reduce the bandwidth utilized by the second RAT during the specified time based at least in part on the interfering frequency.

In certain aspects, the first RAT may be a Long Term Evolution (LTE) RAT, and the second RAT may be a Wireless Local Area Network (WLAN) RAT. The apparatus may further include a transmitter to use the frequency allocated to the first RAT during the specified time for an LTE uplink. The apparatus may also include a receiver to receive LTE uplink scheduling information. Additionally, the apparatus may include a transmitter to transmit, using the second RAT, at least one packet over the reduced bandwidth during the specified time.

In other aspects, the apparatus may include an interference mitigator to determine at least one predefined bandwidth increment that includes the interfering frequency, and to reduce the bandwidth utilized by the second RAT by disabling utilization of a predefined bandwidth increment that includes the interfering frequency.

In additional aspects, the apparatus may include a transmitter to transmit interfering frequency information to an access point based at least in part on the determined interfering frequency. The apparatus may further include a receiver to receive a transmission from the access point during the specified time, the transmission utilizing a reduced bandwidth determined by the interfering frequency information.

In yet another embodiment, an apparatus for wireless communication is disclosed. The apparatus may include means for identifying at least one frequency allocated to a first radio access technology (RAT) during a specified time. The apparatus may also include means for identifying at least one interfering frequency in a bandwidth utilized by a second RAT, the interfering frequency determined based on the frequency allocated to the first RAT during the specified time, and the second RAT being different from the first RAT. The apparatus may further include means for reducing the bandwidth utilized by the second RAT during the specified time based at least in part on the interfering frequency.

In certain aspects, the first RAT may be a Long Term Evolution (LTE) RAT, and the second RAT may be a Wireless Local Area Network (WLAN) RAT. The apparatus may further include means for using the frequency allocated to the first RAT during the specified time for an LTE uplink, and may also further include means for receiving LTE uplink scheduling information. Additionally, the apparatus may include means for transmitting, using the second RAT, at least one packet over the reduced bandwidth during the specified time.

In other aspects, the apparatus may include means for determining at least one predefined bandwidth increment that includes the interfering frequency. The apparatus may further include means for reducing the bandwidth utilized by the second RAT by disabling utilization of the predefined bandwidth increment that includes an interfering frequency.

In yet other aspects, the apparatus may include means for transmitting interfering frequency information to an access point based at least in part on the determined interfering frequency. The apparatus may further include means for receiving a transmission from the access point during the specified time, the transmission utilizing a reduced bandwidth determined by the interfering frequency information.

In yet another embodiment, a non-transitory computer-readable medium storing computer-executable code for wireless communication is disclosed. The code is executable by a processor to identify at least one frequency allocated to a first radio access technology (RAT) during a specified time. The code is also executable by a processor to identify at least one interfering frequency in a bandwidth utilized by a second RAT, the interfering frequency determined based on the frequency allocated to the first RAT during the specified time, and the second RAT being different from the first RAT. The code is also executable by a processor to reduce the bandwidth utilized by the second RAT during the specified time based at least in part on the interfering frequency.

In certain aspects, the first RAT may be a Long Term Evolution (LTE) RAT, and the second RAT may be a Wireless Local Area Network (WLAN) RAT. The code may further be executable by a processor to use the frequency allocated to the first RAT during the specified time for an LTE uplink. Additionally, the code may be executable by a processor to transmit, using the second RAT, at least one packet over the reduced bandwidth during the specified time.

In certain other aspects, the code may further be executable by a processor to determine at least one predefined bandwidth increment that includes the interfering frequency. The code may also be executable by a processor to reduce the bandwidth utilized by the second RAT by disabling utilization of the predefined bandwidth increment that includes an interfering frequency.

In other aspects, the code may be executable by a processor to transmit interfering frequency information to an access point based at least in part on the determined interfering frequency. The code may also be executable by a processor to receive a transmission from the access point during the specified time, the transmission utilizing a reduced bandwidth determined by the interfering frequency information.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present invention may be realized by reference to the following drawings. In the appended figures, similar modules or features may have the same reference label. Further, various modules of the same type may be distinguished by following the reference label by a dash and a second label that distinguishes among the similar modules. If only the first reference label is used in the specification, the description is applicable to any one of the similar modules having the same first reference label irrespective of the second reference label.

DETAILED DESCRIPTION

Figure 1:
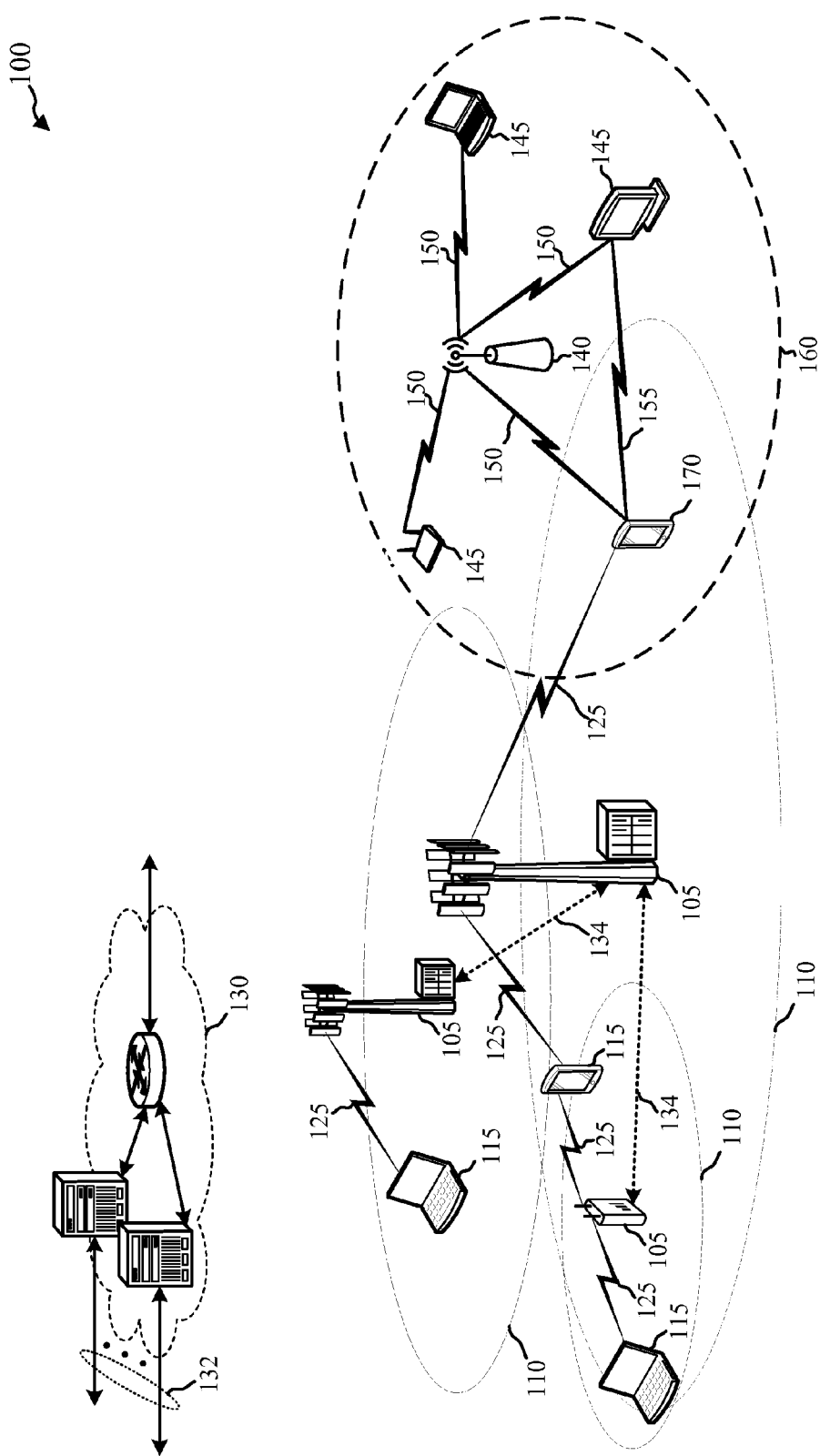
FIG. 1 shows a block diagram of multiple wireless communication systems, in accordance with various aspects of the present disclosure.

A user device, such as a wireless station or a UE, may include multiple radios for accessing multiple wireless networks using different RATs. For example, a wireless station may include a radio for accessing a WLAN. The wireless station may also be referred to as a UE and include a radio for accessing an LTE/LTE-A network. Thus, the wireless station may simultaneously transmit and/or receive communications from both types of networks at the same time. However, interference can result from the simultaneous use of the multiple radios. One type of interference is called intermodulation distortion (IMD), which arises from non-linear operations of two or more transceivers. IMD can result in a loss of sensitivity to the receipt of transmissions. For example, transmissions by the wireless station on the WLAN can result in interference and thus loss of sensitivity to the receipt of transmissions on the LTE/LTE-A network. Similarly, transmissions by the wireless station on the LTE/LTE-A network can result in a loss of sensitivity to the receipt of transmissions on the WLAN.

Sometimes, however, the interference does not arise from the entirety of the bandwidth used by the interfering radio. For example, the wireless station may use a bandwidth for transmission on the WLAN, but only a portion of the WLAN transmission bandwidth may actually give rise to interference on the LTE/LTE-A communications. Accordingly, once the wireless station determines what the interfering frequencies are, the wireless station can dynamically adjust the interfering bandwidth so as to reduce the chance of interference. For example, the wireless station may determine that its LTE/LTE-A radio may receive communications on frequencies that overlap with the bandwidth used by the wireless station for WLAN transmissions. In order to reduce the chance of interference, the wireless station may limit its WLAN transmissions to frequencies that do not overlap with the scheduled LTE/LTE-A frequencies for the period of time for which the LTE/LTE-A communications are scheduled. Similarly, if the wireless station is scheduled to make LTE/LTE-A transmissions on frequencies that could interfere with WLAN reception, the wireless station may inform its access point of the possible conflict and request that the access point send its transmissions over a reduced bandwidth during the time period in which the LTE/LTE-A communications are scheduled to occur. Thus, the bandwidth used for transmission or receipt of WLAN communications can be dynamically adjusted, on a packet-by-packet basis, in order to avoid interference with the resources scheduled for LTE/LTE-A communications.

The following description provides examples, and is not limiting of the scope, applicability, or examples set forth in the claims. Changes may be made in the function and arrangement of elements discussed without departing from the scope of the disclosure. Various examples may omit, substitute, or add various procedures or modules as appropriate. For instance, the methods described may be performed in an order different from that described, and various steps may be added, omitted, or combined. Also, features described with respect to some examples may be combined in other examples.

FIG. 1 illustrates an example of a wireless communications system 100 in accordance with various aspects of the disclosure. The wireless communications system 100 includes multiple networks using multiple types of radio access technologies. One network illustrated in the wireless communications system 100 is a WLAN. Another network included in the wireless communications system 100 is an LTE/LTE-A network. Other networks could be included as well. A wireless station 170 is also illustrated as a wireless station that is in communication with both the WLAN and the LTE/LTE-A network. Thus, the wireless station 170 includes multiple radios for simultaneous communications using different types of networks. As explained below, the wireless station 170 also includes an interference mitigation module to dynamically adjust the bandwidth used for WLAN transmission so as to reduce the chance of interfering with LTE/LTE-A reception on the wireless station 170.

The LTE/LTE-A network portion of the wireless communications system 100 includes base stations 105, UEs 115, and a core network 130. The base stations 105 may communicate with the UEs 115 under the control of a base station controller (not shown), which may be part of the core network 130 or the base stations 105 in various aspects of the disclosure. Base stations 105 may communicate control information and/or user data with the core network 130 through backhaul links 132. In various examples, the base stations 105 may communicate, either directly or indirectly, with each other over backhaul links 134, which may be wired or wireless communication links Operation on multiple carriers (e.g., waveform signals of different frequencies) may be supported. Multi-carrier transmitters can transmit modulated signals simultaneously on the multiple carriers. For example, each communication link 125 may be a multi-carrier signal modulated according to the various radio technologies described above. Each modulated signal may be sent on a different carrier and may carry control information (e.g., reference signals, control channels, etc.), overhead information, data, etc.

The base stations 105 may wirelessly communicate with the UEs 115 via base station antennas. Each of the base station 105 sites may provide communication coverage for a respective geographic coverage area 110. In some examples, base stations 105 may be referred to as a base transceiver station, a radio base station, an access point, a radio transceiver, a basic service set (BSS), an extended service set (ESS), a NodeB, eNodeB (eNB), Home NodeB, a Home eNodeB, or some other suitable terminology. The geographic coverage area 110 for a base station may be divided into sectors making up only a portion of the coverage area (not shown). The wireless communications system 100 may include base stations 105 of different types (e.g., macro and/or small cell base stations). There may be overlapping geographic coverage areas 110 for different technologies.

In some examples, the base stations 105, UEs 115, and the core network 130 may comprise an LTE/LTE-A network. In LTE/LTE-A networks, the terms evolved Node B (eNB) and UE may be generally used to describe the base stations 105 and UEs 115, respectively. The LTE/LTE-A network may be a Heterogeneous LTE/LTE-A network in which different types of eNBs provide coverage for various geographical regions. For example, each eNB or base station 105 may provide communication coverage for a macro cell, a small cell, and/or other types of cell. The term "cell" is a 3GPP term that can be used to describe a base station, a carrier associated with a base station, or a coverage area (e.g., sector, etc.) of a carrier or base station, depending on context.

A macro cell generally covers a relatively large geographic area (e.g., several kilometers in radius) and may allow unrestricted access by UEs with service subscriptions with the network provider. A small cell can be a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell may cover a relatively smaller geographic area and may allow unrestricted access by UEs with service subscriptions with the network provider. A femto cell also may cover a relatively small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB or a home eNB. An eNB may support one or multiple (e.g., two, three, four, and the like) cells.

The core network 130 may communicate with the base stations 105 via the backhaul link 132 (e.g., S1, etc.). The base stations 105 may also communicate with one another, e.g., directly or indirectly via backhaul links 134 (e.g., X2, etc.) and/or via backhaul links 132 (e.g., through core network 130). The network may support either synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The UEs 115 are dispersed throughout the network and may be stationary or mobile. A UE 115 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with various types of base stations and network equipment including macro eNBs, small cell eNBs, RRHs, relays, and the like.

The communication links 125 may include uplink (UL) transmissions from a UE 115 to a base station 105, and/or downlink (DL) transmissions, from a base station 105 to a UE 115. The downlink transmissions may also be called forward link transmissions while the uplink transmissions may also be called reverse link transmissions. The communication links 125 may transmit bidirectional communications using FDD (e.g., using paired spectrum resources) or TDD operation (e.g., using unpaired spectrum resources). Frame structures for FDD (e.g., frame structure type 1) and TDD (e.g., frame structure type 2) may be defined.

The WLAN portion of the wireless communications system 100 implements at least one of the IEEE 802.11 family of standards and includes an access point (AP) 140 and wireless devices or stations (STAs) 145, such as mobile stations, personal digital assistants (PDAs), other handheld devices, netbooks, notebook computers, tablet computers, laptops, display devices (e.g., TVs, computer monitors, etc.), printers, etc. While only one AP 140 is illustrated, the WLAN network may have multiple APs 140. Each of the wireless stations 145, which may also be referred to as mobile stations (MSs), mobile devices, access terminals (ATs), user equipment (UE), subscriber stations (SSs), or subscriber units, may associate and communicate with an AP 140 via a communication link 150. Each AP 140 has a geographic coverage area 160 such that wireless stations 145 within that area can typically communicate with the AP 140. The wireless stations 145 may be dispersed throughout the geographic coverage area 160. Each wireless station 145 may be stationary or mobile.

Although not shown in FIG. 1, a wireless station 145 can be covered by more than one AP 140 and can therefore associate with one or more APs 140 at different times. A single AP 140 and an associated set of stations may be referred to as a basic service set (BSS). An extended service set (ESS) can be a set of connected BSSs. A distribution system (DS) (not shown) is used to connect APs 140 in an extended service set. A geographic coverage area 160 for an access point 140 may be divided into sectors making up only a portion of the coverage area (not shown). The WLAN network may include access points 140 of different types (e.g., metropolitan area, home network, etc.), with varying sizes of coverage areas and overlapping coverage areas for different technologies. Although not shown, other wireless devices can communicate with the AP 140.

While the wireless stations 145 may communicate with each other through the AP 140 using communication links 150, each wireless station 145 may also communicate directly with one or more other wireless stations 145 via a direct wireless link 155. Two or more wireless stations 145 may communicate via a direct wireless link 155 when both wireless stations 145 are in the AP geographic coverage area 160 or when one or neither wireless station 145 is within the AP geographic coverage area 160 (not shown). Examples of direct wireless links 155 may include Wi-Fi Direct connections, connections established by using a Wi-Fi Tunneled Direct Link Setup (TDLS) link, and other P2P group connections. The wireless stations 145 in these examples may communicate according to the WLAN radio and baseband protocol including physical and medium access control (MAC) layers from IEEE 802.11, and its various versions including, but not limited to, 802.11b, 802.11g, 802.11a, 802.11n, 802.11ac, 802.11ad, 802.11ah, etc. In other implementations, other peer-to-peer connections and/or ad hoc networks may be used.

The communication networks that may accommodate some of the various disclosed examples may be packet-based networks that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A MAC layer may perform priority handling and multiplexing of logical channels into transport channels. The MAC layer may also use Hybrid ARQ (HARQ) to provide retransmission at the MAC layer to improve link efficiency. In the control plane, the Radio Resource Control (RRC) protocol layer may provide establishment, configuration, and maintenance of an RRC connection between a UE 115 or wireless station 145 and, for example, the core network 130 or other network used for the user plane data. At the physical (PHY) layer, the transport channels may be mapped to physical channels.

As identified above, wireless station 170 acts as both a wireless station 145 as well as a UE 115. Thus, wireless station 170 represents a user device that includes multiple radios for simultaneous communications using multiple different RATs. In order to reduce the chances of interference arising from the use of multiple radios, the wireless device 170 includes an interference mitigation module, as explained in greater detail below. The AP 140 with which the wireless station 170 is in communication may also include an interference mitigation module that can receive requests from wireless device 170 and dynamically adjust the bandwidth of communications transmitted to the wireless device 170 in response to the received request.

Figure 2:
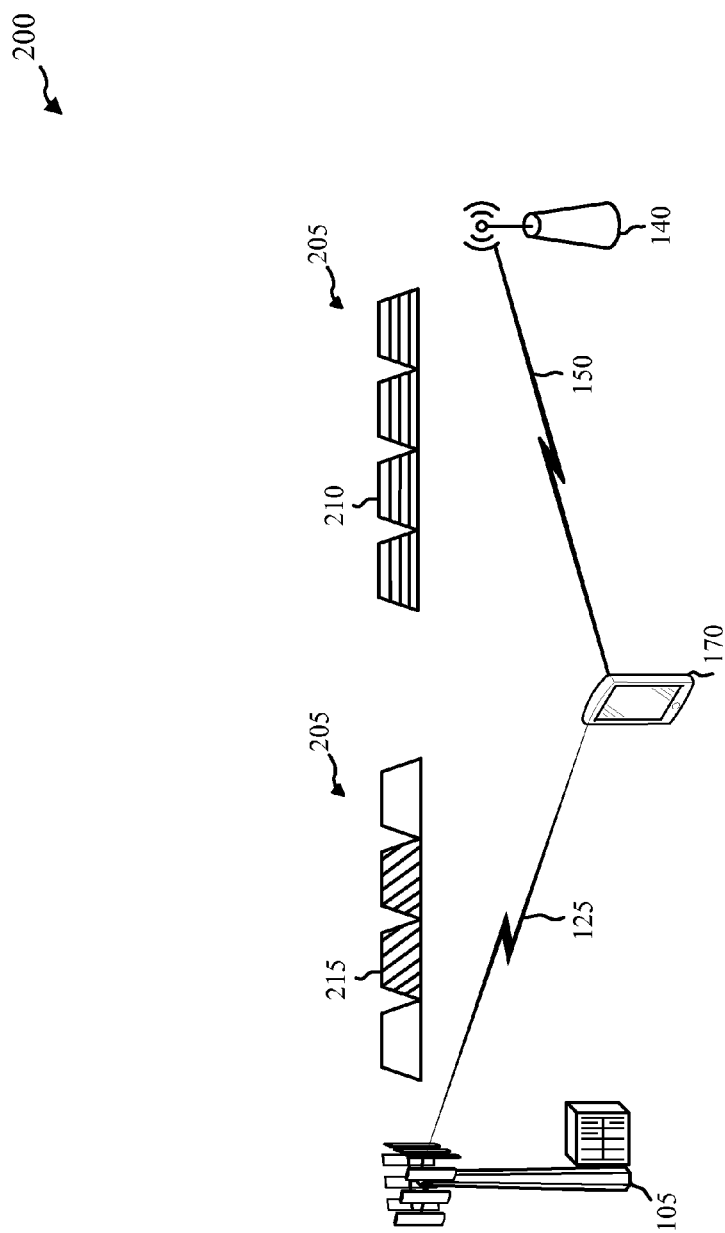
FIG. 2 shows a user device communicating on multiple wireless communication systems, in accordance with various aspects of the present disclosure.

FIG. 2 illustrates a block diagram 200 that represents the communications between wireless station 170 and multiple networks. In particular, block diagram 200 shows the wireless station 170 in communication with the base station 105 and the access point 140, as described in FIG. 1. The communications between the wireless station 170 and the base station 105 are via communication link 125, while the communications between the wireless station 170 and the access point 140 are via communication link 150.

Communications via the communication links 125, 150 are transmitted and received using one or more bandwidths. In FIG. 2, total bandwidth 205 is illustrated as being available for both communication link 125 as well as communication link 150. The communication links 125, 150 may each use different bandwidths and/or multiple bandwidths which may overlap. Block diagram 200 illustrates one example of the use of total bandwidth 205 on communication links 125, 150. In the example, the wireless station 170 sends a WLAN transmission to the access point 140 using the entirety of the total bandwidth 205. The frequencies occupied by the transmission are indicated as WLAN frequencies 210. The wireless station 170 can also be scheduled to receive an LTE/LTE-A communication from the base station 105. The LTE/LTE-A communication can be scheduled to use at least some resource blocks (RBs) or conflicting frequencies 215 within the total bandwidth 205. Therefore, in this example, the wireless station 170 can expect to have reduced sensitivity to the reception of the LTE/LTE-A communications as a result of the overlap between the frequencies on which the WLAN transmission is occurring and the frequencies on which the LTE/LTE-A reception may occur.

However, because LTE/LTE-A resources are scheduled in advance, the wireless station 170 may adjust its own transmission of WLAN communications, or even instruct the access point 140 to adjust its transmission of WLAN communications so as to not overlap with LTE/LTE-A communications. LTE/LTE-A resource scheduling can change on a millisecond-by-millisecond basis and may be known by the wireless station 170 about 3 milliseconds in advance of the actual LTE/LTE-A communication. Therefore WLAN bandwidth adjustment by the wireless station 170 can also occur just as frequently and as quickly, meaning that bandwidth adjustment may be performed dynamically and on a packet-by-packet basis. The wireless station 170 can dynamically choose its WLAN packet bandwidth on a packet-by-packet basis such that WLAN packet bandwidth does not overlap with scheduled LTE/LTE-A resources.

Figure 3A:
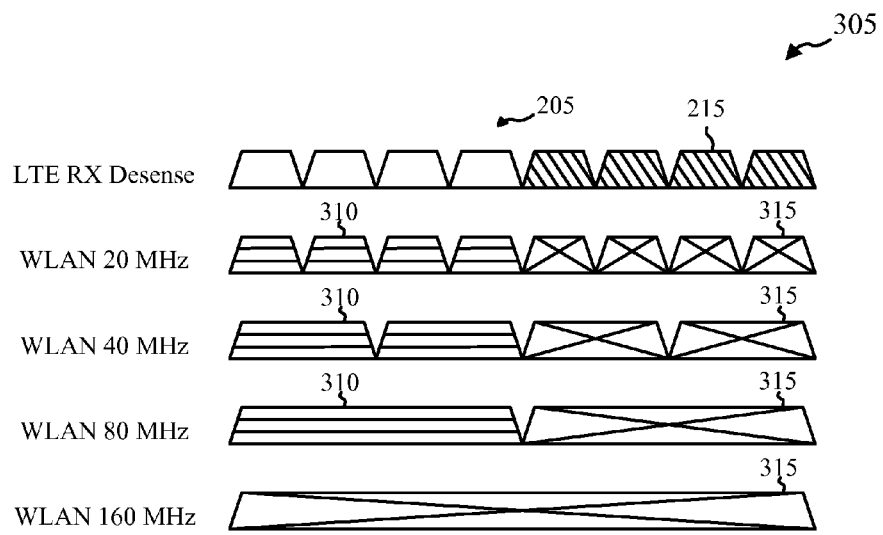
FIGS. 3A, 3B and 3C show examples of dynamic packet bandwidth adjustment, in accordance with various aspects of the present disclosure.

FIG. 3A illustrates an example 305 of how the wireless station 170 can dynamically adjust its WLAN transmission bandwidth in order to avoid reducing LTE/LTE-A reception sensitivity. Example 305 illustrates the total bandwidth 205 that may be used by the wireless station 170 to transmit WLAN communications. Of the frequencies in the total bandwidth 205, however, some of the frequencies (the conflicting frequencies 215) are also scheduled for use during LTE/LTE-A communications. The wireless station 170 may recognize the potential conflict as the wireless station 170 receives LTE/LTE-A scheduling information. Thus, if WLAN communications are allowed to occur on the conflicting frequencies 215 during the time that the LTE/LTE-A communications are received by the wireless station 170, the receipt of the LTE/LTE-A transmissions may be jeopardized—the sensitivity of the wireless station 170 to the LTE/LTE-A transmission may be reduced. Thus, in order to avoid the potential interference, the wireless station 170 may adjust its WLAN frequencies 310. In the example 305, the wireless station 170 would be able to send WLAN transmissions using WLAN frequencies 310 organized in 20 MHz bands, 40 MHz bands, and even 80 MHz bands. For example, as the conflicting frequencies 215 in the example 305 occupy the right half of the total bandwidth 205, the WLAN frequencies 310 may be reduced to occupy the left half of the total bandwidth 205. If 20 MHz bandwidths are used for WLAN transmission, the first four 20 MHz bands may be used as WLAN frequencies 310 while the last four 20 MHZ bands are reserved as unused WLAN frequencies 315 in order to reduce the chances of interference. If 40 MHz bandwidths are used for WLAN transmission, the first two 40 MHz bands may be used as WLAN frequencies 310 while the last two 40 MHz bands are reserved as unused WLAN frequencies 315. If 80 MHz bandwidths are used for WLAN transmission, a first 80 MHz band is designated as a WLAN frequency 310 while the second or last 80 MHz band is designated as an unused WLAN frequency 315. In example 305, WLAN transmissions would not be made using the 160 MHz band as this would use the conflicting frequencies 215. Instead, the 160 MHz band would be reserved as unused WLAN frequencies 315.

While FIG. 3A identifies specific bandwidths increments (e.g., 20 MHz, 40 MHz, 80 MHz and 160 MHz) that may be used during interference mitigation, other bandwidth increments may also be used. The bandwidth increments may be predefined or could be dynamically adjusted. Regardless of the bandwidth increment, example 305 illustrates that bandwidth increments that include WLAN frequencies 310 that may interfere with the conflicting frequencies 215 may be designated as unused WLAN frequencies 315 in order to reduce the chance of interference.

Figure 3B:
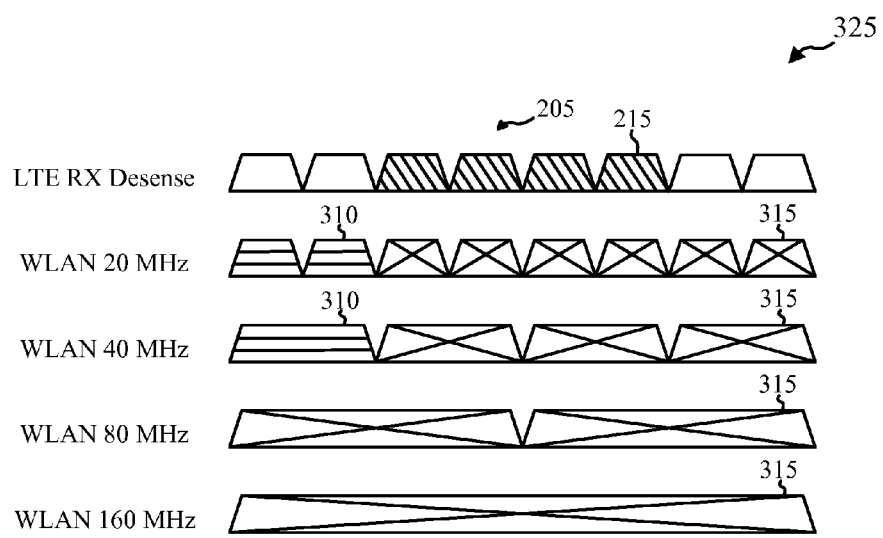

FIG. 3B illustrates another example 325 of how the wireless station 170 can dynamically adjust its WLAN transmission bandwidth in order to avoid reducing LTE/LTE-A reception sensitivity. In example 325, the conflicting frequencies 215 are in the middle of the total bandwidth 205. In the example 325, the wireless station 170 would be able to send WLAN transmissions using WLAN frequencies 310 organized in 20 MHz bands and 40 MHz bands. For example, the WLAN frequencies 310 may be reduced to occupy the left quarter of the total bandwidth 205. If 20 MHz bandwidths are used for WLAN transmission, the first two 20 MHz bands may be used as WLAN frequencies 310 while the remaining 20 MHZ bands are reserved as unused WLAN frequencies 315. If 40 MHz bandwidths are used for WLAN transmission, the first 40 MHz band may be used as a WLAN frequency 310 while the last three 40 MHz bands are reserved as unused WLAN frequencies 315. In example 325, WLAN transmissions would not be made using either the 80 MHz bands or the 160 MHz band as these would use the conflicting frequencies 215. Instead, the 80 MHz bands and the 160 MHz band would be reserved as unused WLAN frequencies 315.

Figure 3C:
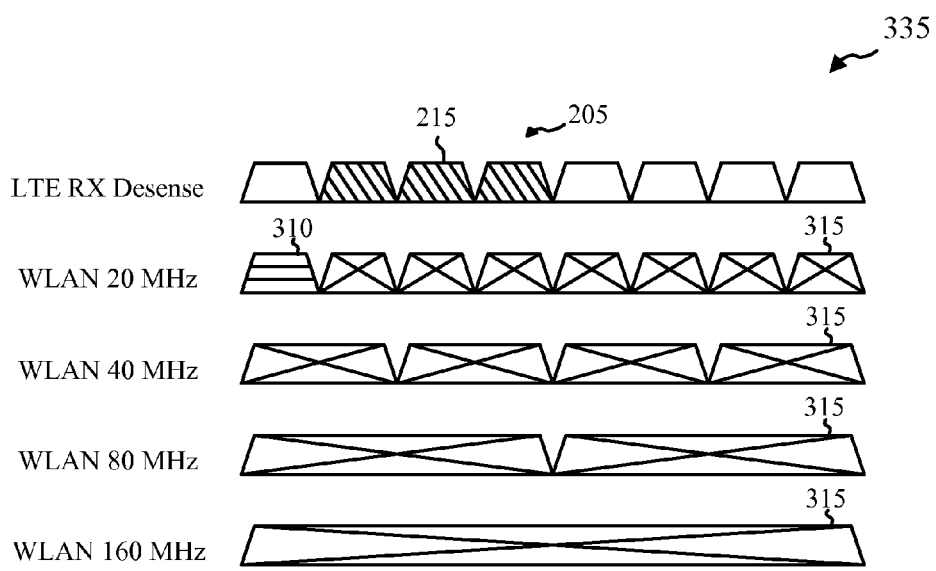

FIG. 3C illustrates another example 335 of how the wireless station 170 can dynamically adjust its WLAN transmission bandwidth in order to avoid reducing LTE/LTE-A reception sensitivity. In example 335, the conflicting frequencies 215 are near the beginning of the total bandwidth 205, thus restricting the WLAN transmissions to use of only the 20

MHz bands. For example, if 20 MHz bandwidths are used for WLAN transmission, only the first 20 MHz band may be used as WLAN frequencies 310 while the remaining 20 MHZ bands are reserved as unused WLAN frequencies 315. In example 335, WLAN transmissions would not be made using either the 40, 80 or 160 MHz bands as these would use the conflicting frequencies 215. Instead, the 40, 80 and 160 MHz bands would be reserved as unused WLAN frequencies 315.

Interference can also occur during the receipt of WLAN communications. LTE/LTE-A transmissions by the wireless station 170 on frequencies that overlap with those on which WLAN communications are expected to be received may also result in reduced sensitivity to the received WLAN communications. Thus, when the wireless station 170 receives LTE/LTE-A scheduling information, the wireless station 170 can notify the access point with which it is in communication that transmissions from the access point should use frequencies that don't overlap with the scheduled LTE/LTE-A frequencies.

Figure 4:
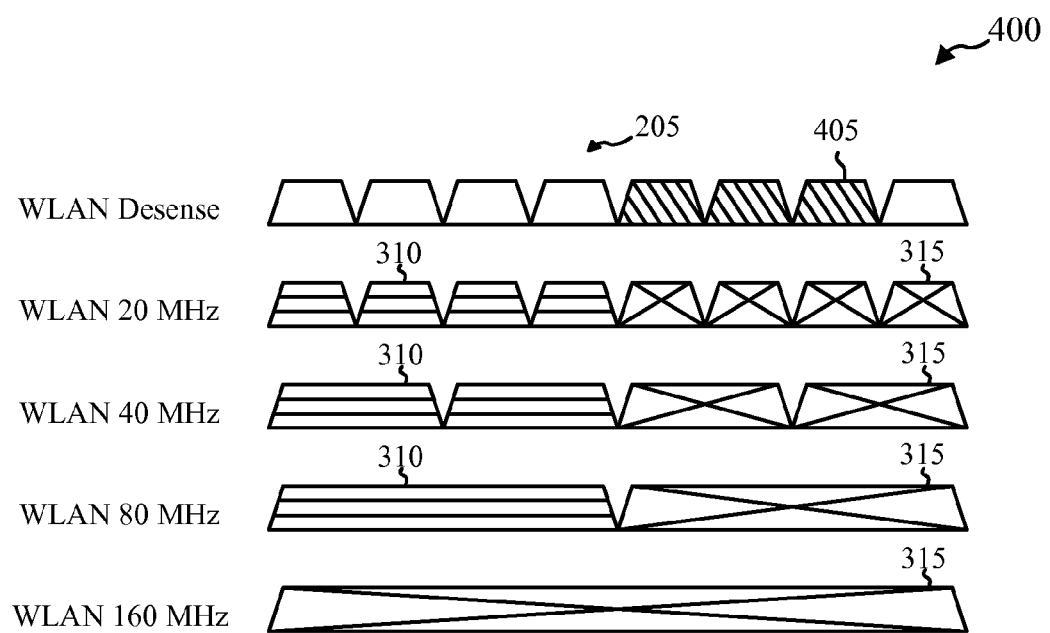
FIG. 4 shows an example of a dynamic packet bandwidth adjustment, in accordance with various aspects of the present disclosure.

An example of this is illustrated in FIG. 4. FIG. 4 illustrates an example 400 of how the wireless station 170 can inform its access point 140 to dynamically adjust its WLAN transmission bandwidth. In the example 400, the wireless station 170 is scheduled to transmit LTE/LTE-A transmissions on a portion of the total bandwidth 205. The scheduled resources may conflict with reception by the wireless station 170 of WLAN communications, as illustrated by the indicated conflicting frequencies 405. Thus, in order to avoid the potential interference, the wireless station 170 may notify its access point 140 that WLAN communications should be limited to, in example 400, WLAN frequencies 310 organized in 20 MHz bands, 40 MHz bands, and even 80 MHz bands. For example, as the conflicting frequencies 405 in the example 400 occupy most of the right half of the total bandwidth 205, the WLAN frequencies 310 may be reduced to occupy the left half of the total bandwidth 205. If 20 MHz bandwidths are used for WLAN transmission by the access point 140, the first four 20 MHz bands may be used as WLAN frequencies 310 while the last four 20 MHZ bands are reserved as unused WLAN frequencies 315 in order to reduce the chances of interference during the reception of the WLAN communications by the wireless station 170. If 40 MHz bandwidths are used for WLAN transmission by the access point 140, the first two 40 MHz bands may be used as WLAN frequencies 310 while the last two 40 MHz bands are reserved as unused WLAN frequencies 315. If 80 MHz bandwidths are used for WLAN transmission, a first 80 MHz band is designated as a WLAN frequency 310 while the second or last 80 MHz band is designated as an unused WLAN frequency 315. In example 400, WLAN transmissions by the access point 140 would not be made using the 160 MHz band as this would use the conflicting frequencies 405. Instead, the 160 MHz band would be reserved as unused WLAN frequencies 315.

Figure 5:
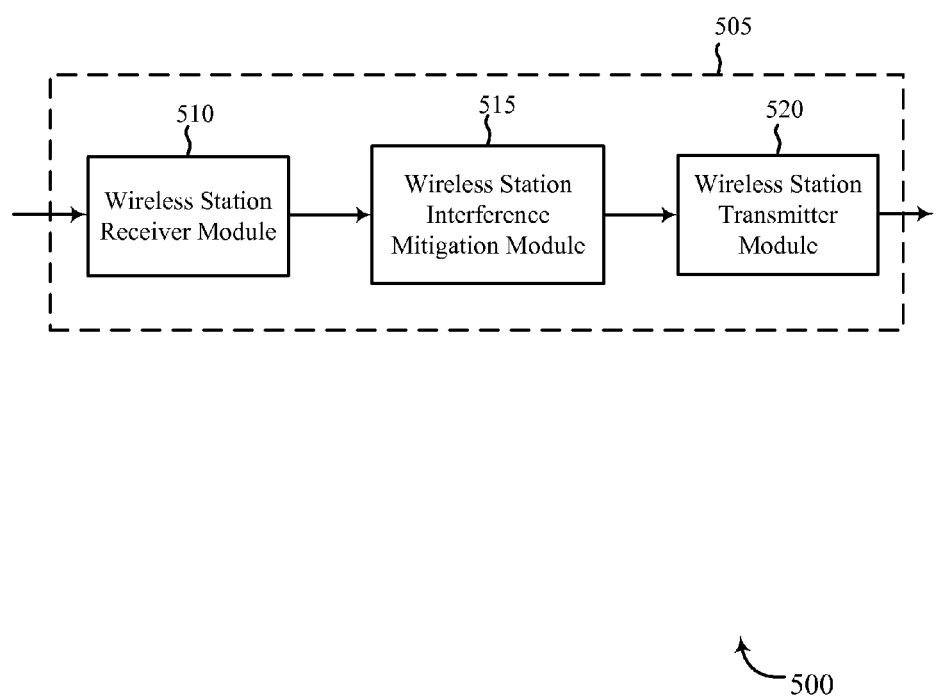
FIG. 5 shows a block diagram of an apparatus for use in wireless communication, in accordance with various aspects of the present disclosure.

FIG. 5 shows a block diagram 500 of an apparatus 505 for use in a station for wireless communication, in accordance with various aspects of the present disclosure. In some examples, the apparatus 505 may be an example of aspects of the wireless station 170 described with reference to FIGS. 1, 2, 3A, 3B, 3C and/or 4. The apparatus 505 may also be or include a processor (not shown). The apparatus 505 may include a wireless station receiver module 510, a wireless station interference mitigation module 515, and/or a wireless station transmitter module 520. Each of these modules may be in communication with each other.

The apparatus 505, through the wireless station receiver module 510, the wireless station interference mitigation module 515, and/or the wireless station transmitter module 520, may perform functions described herein. For example, the apparatus 505 may receive an LTE/LTE-A schedule, identify potentially conflicting frequencies used in both WLAN communications and LTE/LTE-A communications, and dynamically adjust, on a packet-by-packet basis, the frequencies used for WLAN transmission so as to reduce the chance of interfering with LTE/LTE-A reception. Additionally, the apparatus 505 may notify an access point of the potentially conflicting frequencies so that the access point can transmit WLAN communications using non-interfering frequencies.

The modules of the apparatus 505 may, individually or collectively, be implemented using application-specific integrated circuits (ASICs) adapted to perform some or all of the applicable functions in hardware. Alternatively, the functions may be performed by other processing units (or cores), on integrated circuits. In other examples, other types of integrated circuits may be used (e.g., Structured/Platform ASICs, Field-Programmable Gate Arrays (FPGAs), and other semi-custom integrated circuits (ICs)), which may be programmed in any manner known in the art. The functions of each module may also be implemented, in whole or in part, with instructions embodied in a memory, formatted to be executed by general or application-specific processors.

The wireless station receiver module 510 may receive information such as packets, user data, and/or control information associated with various information channels (e.g., control channels, data channels, etc.). The wireless station receiver module 510 may receive, for example, scheduling information describing the schedule and frequencies to be used by the apparatus 505 for LTE/LTE-A communications. The LTE/LTE-A scheduling information may be passed on to the wireless station interference mitigation module 515, and to other modules of the device 505. The wireless station receiver module 510 may also receive various types of transmissions from different wireless networks. For example, the wireless station receiver module 510 may receive both LTE/LTE-A and WLAN communications. To do this, the wireless station receiver module 510 may utilize multiple radios.

The wireless station interference mitigation module 515 may receive LTE/LTE-A scheduling information from the wireless station receiver module 510 and use the received LTE/LTE-A scheduling information to determine whether adjustments should be made to the apparatus's WLAN communication frequencies. If adjustments to WLAN transmission frequencies are to be made in order to avoid desensitizing the reception of LTE/LTE-A transmissions, the wireless station interference mitigation module 515 may dynamically adjust the packet-by-packet bandwidth of its WLAN transmissions, based on the LTE/LTE-A scheduling information. If adjustments to WLAN reception frequencies are to be made in order to avoid desensitizing of the WLAN communications reception by LTE/LTE-A transmissions, the wireless station interference mitigation module 515 may prepare a message to the access point in communication with apparatus 505 to notify the access point that its WLAN transmission frequencies should be adjusted.

The wireless station transmitter module 520 may transmit the signals received from other modules of the apparatus 505. For example, the transmitter module 520 may transmit either WLAN or LTE/LTE-A transmissions, using multiple radios. The LTE/LTE-A transmissions are performed in accordance with the received LTE/LTE-A scheduling information. The WLAN transmissions are made using frequencies that reduce the chance of interference with LTE/LTE-A communications reception, as identified by the wireless station interference mitigation module 515. The wireless station transmitter module 520 may also transmit messages from the wireless station interference mitigation module 515 to an access point, requesting that the access point adjust its WLAN transmission frequencies. In some examples, the wireless station transmitter module 520 may be collocated with the wireless station receiver module 510 in a wireless station transceiver module. The wireless station transmitter module 520 may utilize multiple antennas.

Figure 6:
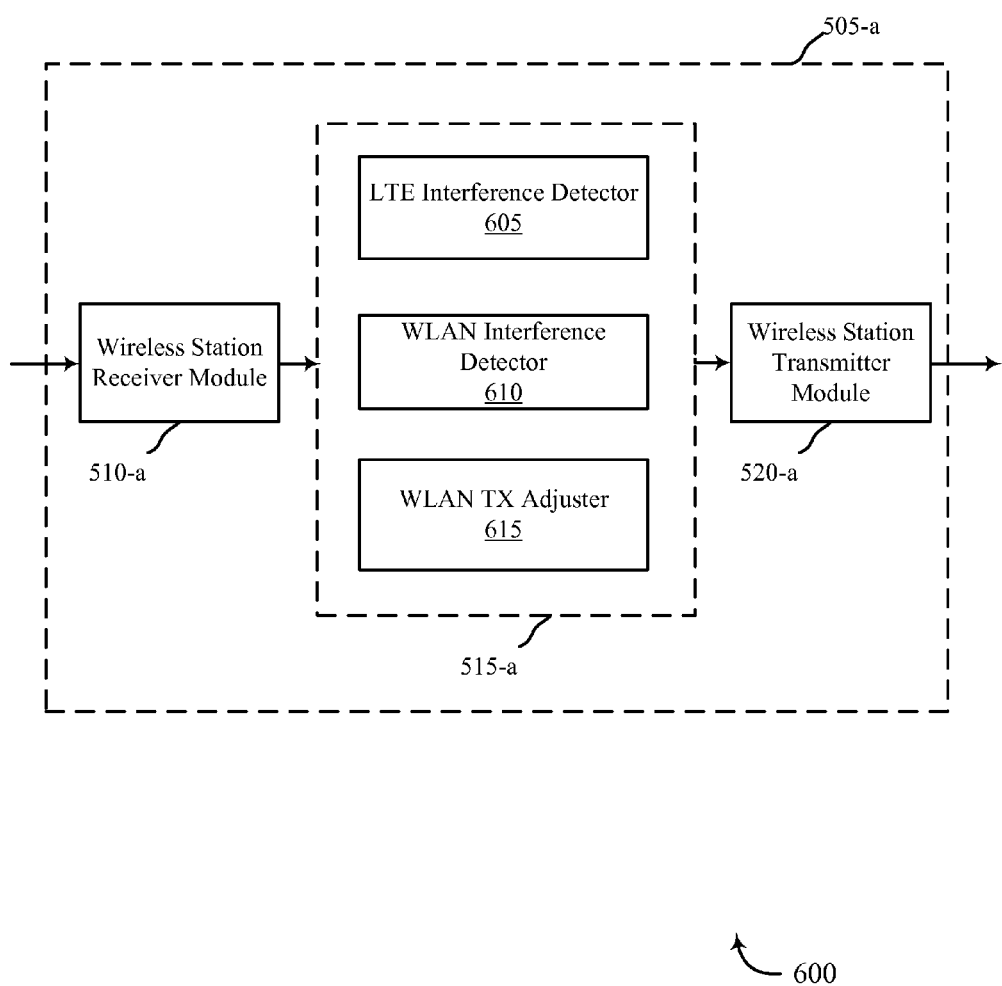
FIG. 6 shows a block diagram of an apparatus for use in wireless communication, in accordance with various aspects of the present disclosure.

FIG. 6 shows a block diagram 600 of an apparatus 505-*a* that is used in a wireless station for wireless communication, in accordance with various examples. The apparatus 505-*a* may be an example of aspects of the wireless station 170 described with reference to FIGS. 1, 2, 3A, 3B, 3C and/or 4. It may also be an example of an apparatus 505 described with reference to FIG. 5. The apparatus 505-*a* may include a wireless station receiver module t10-*a*, a wireless station interference mitigation module 515-*a*, and/or a wireless station transmitter module 520-*a*, which may be examples of the corresponding modules of apparatus 505. The apparatus 505-*a* may also include a processor (not shown). Each of these modules may be in communication with each other. The wireless station interference mitigation module 515-*a* may include an LTE interference detector 605, a WLAN interference detector 610, and/or a WLAN transmission adjustor 615. The wireless station receiver module 510-*a* and the wireless station transmitter module 520-*a* may perform the functions of the wireless station receiver module 510 and the wireless station transmitter module 520, of FIG. 5, respectively.

The LTE interference detector 605 may be a component of the wireless station interference mitigation module 515-*a* and may be used to detect whether LTE/LTE-A communications with the apparatus 505-*a* may be prone to interference. In particular, the LTE interference detector 605 may receive LTE/LTE-A scheduling information for the apparatus 505-*a*. The LTE/LTE-A scheduling information may identify the frequencies and timing of LTE/LTE-A transmissions that the apparatus 505-*a* is to transmit. However, from this information, the LTE interference detector 605 is able to determine the frequencies and timing of LTE/LTE-A transmissions that the apparatus 505-*a* is to receive. The LTE/LTE-A scheduling information may be received by the wireless station receiver module 510-*a* and then passed on to the LTE interference detector 605, for example. Once the LTE interference detector 605 is in possession of the LTE/LTE-A scheduling information, the LTE interference detector 605 can use the LTE/LTE-A scheduling information to determine whether the bandwidth of any concurrently scheduled WLAN transmissions should be reduced. If so, the LTE interference detector 605 may notify the WLAN transmission adjustor 615.

The WLAN interference module 610 may be a component of the wireless station interference mitigation module 515-*a* and may be used to detect whether WLAN communications with the apparatus 505-*a* may be prone to interference. In particular, the WLAN interference detector 610 may receive LTE/LTE-A scheduling information for the apparatus 505-*a*. The LTE/LTE-A scheduling information may identify the frequencies and timing of LTE/LTE-A transmission that the apparatus 505-*a* is to send. The LTE/LTE-A scheduling information may be received by the wireless station receiver module 510-*a* and then passed on to the WLAN interference detector 610, for example. Once the WLAN interference detector 610 is in possession of the LTE/LTE-A scheduling information, the WLAN interference detector 610 can use the LTE/LTE-A scheduling information to determine whether the bandwidth of any WLAN transmissions that are expected to be received by the apparatus 505-*a* should be reduced. If so, the WLAN interference detector 610 may generate a message for an access point in communication with the apparatus 505-*a*, thereby notifying the access point that interference may occur and that the access point should reduce the bandwidth of its WLAN transmissions to the apparatus 505-*a* during the scheduled time. The message may be sent to the access point via the wireless station transmitter module 520-*a*.

The WLAN transmission adjustor 615 receives messages from the LTE interference detector 605 and adjusts the WLAN transmission bandwidths of packets scheduled to be sent during times when LTE/LTE-A communications are occurring on frequencies that may be prone to interference, as determined by the LTE interference detector 605. Bandwidth adjustments may be made on a packet-by-packet basis, and may be updated as frequently as LTE/LTE-A scheduling information is received by the apparatus 505-*a*. The bandwidth adjustment details (meaning the frequencies and timing of each adjustment) may be passed to the wireless station transmitter module 520-*a* to be used for the actual WLAN transmissions.

Figure 7:
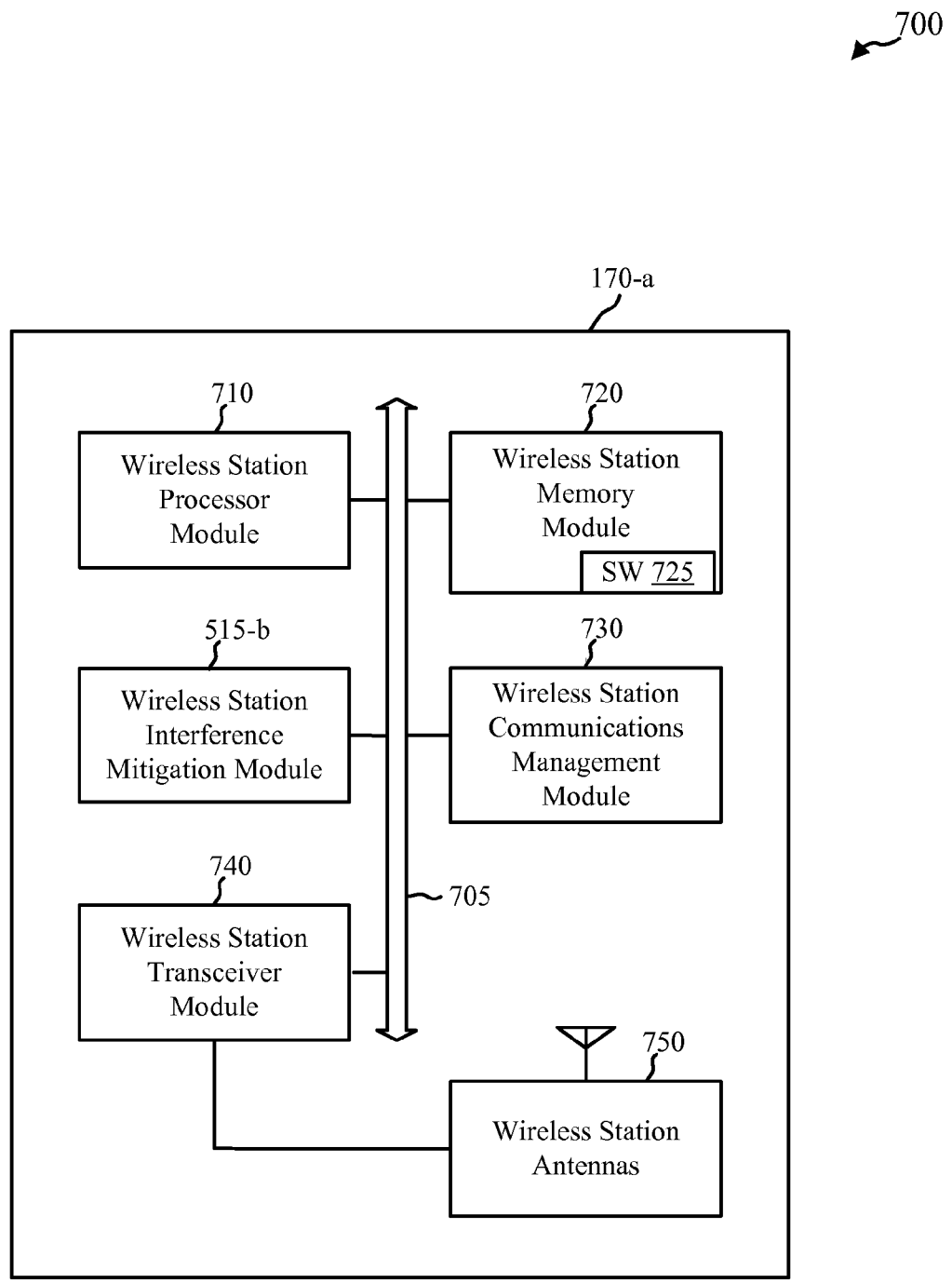
FIG. 7 shows a block diagram of a wireless station for use in wireless communication, in accordance with various aspects of the present disclosure.

Turning to FIG. 7, a diagram 700 is shown that illustrates a wireless station 170-*a* for mitigation interference arising from operation of multiple radios utilizing different RATs. The wireless station 170-*a* may have various other configurations and may be included or be part of a personal computer (e.g., laptop computer, netbook computer, tablet computer, etc.), a cellular telephone, a PDA, a digital video recorder (DVR), an internet appliance, a gaming console, an e-readers, etc. The wireless station 170-*a* may have an internal power supply (not shown), such as a small battery, to facilitate mobile operation. The wireless station 170-*a* may be an example of the wireless stations 170 described with relation to FIGS. 1, 2, 3A, 3B, 3C and/or 4 as well as the apparatus 505 described with relation to FIGS. 5 and/or 6.

The wireless station 170-*a* may include a wireless station processor module 710, a wireless station memory module 720, a wireless station transceiver module 740, wireless station antennas 750, and a wireless station interference mitigation module 515-*b*. The wireless station interference mitigation module 515-*b* may be an example of the wireless station interference mitigation module 515 of FIGS. 5 and/or 6. Each of these modules may be in communication with each other, directly or indirectly, over at least one bus 705.

The wireless station memory module 720 may include RAM and ROM. The wireless station memory module 720 may store computer-readable, computer-executable software (SW) code 725 containing instructions that, when executed, cause the wireless station processor module 710 to perform various functions described herein for mitigating interference between concurrent communications on different radios using different RATs. Alternatively, the software code 725 may not be directly executable by the wireless station processor module 710 but may cause the computer (e.g., when compiled and executed) to perform functions described herein.

The wireless station processor module 710 may include an intelligent hardware device, e.g., a CPU, a microcontroller, an ASIC, etc. The wireless station processor module 710 may process information received through the wireless station transceiver module 740 and/or to be sent to the wireless station transceiver module 740 for transmission through the wireless station antennas 750. The wireless station processor module 710 may handle, alone or in connection with the wireless station interference mitigation module 515-*b*, various aspects for mitigating interference between concurrent communications on multiple radios using different RATs.

The wireless station transceiver module 740 may communicate bi-directionally with both base stations 105 and access points 140 (in FIGS. 1 and/or 2, for example). The wireless station transceiver module 740 may be implemented as multiple radios, each including at least one transmitter module and at least one separate receiver module. The wireless station transceiver module 740 may include a modem that modulates the packets and provides the modulated packets to the wireless station antennas 750 for transmission, and demodulates packets received from the wireless station antennas 750. The wireless station 170-*a* may include multiple wireless station antennas 750.

According to the architecture of FIG. 7, the wireless station 170-*a* may further include a wireless station communications management module 730. The wireless station communications management module 730 may manage communications with various base stations and/or access points. The wireless station communications management module 730 may be a module of the wireless station 170-*a* in communication with some or all of the other modules of the wireless station 170-*a* over the at least one bus 705. Alternatively, functionality of the wireless station communications management module 730 may be implemented as a module of the wireless station transceiver module 740, as a computer program product, and/or as at least one controller element of the wireless station processor module 710.

The modules of the wireless station 170-*a* may implement aspects discussed above with respect to FIGS. 1, 2, 3A, 3B, 3C, 4, 5 and/or 6, and those aspects may not be repeated here for the sake of brevity. Moreover, the modules of the wireless station 170-*a* may implement aspects discussed below with respect to FIGS. 10, 11 and/or 12, and those aspects may not be repeated here also for the sake of brevity.

Figure 8:
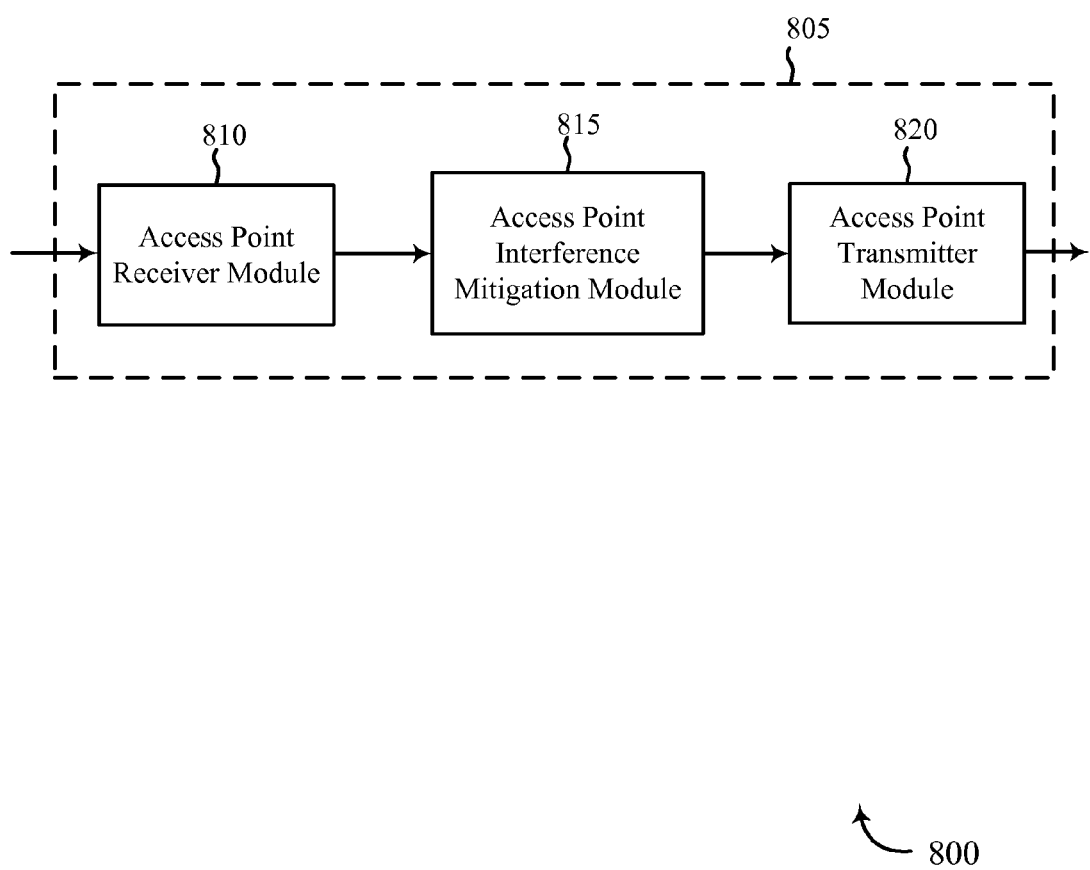
FIG. 8 shows a block diagram of a device for use in wireless communication, in accordance with various aspects of the present disclosure.

FIG. 8 shows a block diagram 800 of a device 805 for use in an access point or AP for wireless communication, in accordance with various aspects of the present disclosure. The device 805 may be an example of aspects of the AP 140 described with reference to FIGS. 1, 2 and/or 4. The device 805 may include an access point receiver module 810, an access point interference mitigation module 815, and/or an access point transmitter module 820. The device 805 may also be or include a processor (not shown). Each of these modules may be in communication with each other.

The device 805, through the access point receiver module 810, the access point interference mitigation module 815, and/or the access point transmitter module 820, may perform functions described herein. For example, the device 805 may receive a message from a wireless station 170 indicating that WLAN transmission from the device 805 to the wireless station 170 should be performed on a reduced bandwidth. The specific frequencies and the timing of the reduction in transmission bandwidth may be included in the received message. In accordance with the received message, the device 805 may adjust its WLAN transmission bandwidths on a packet-by-packet basis.

The modules of the device 805 may, individually or collectively, be implemented using ASICs adapted to perform some or all of the applicable functions in hardware. Alternatively, the functions may be performed by other processing units (or cores), on integrated circuits. In other examples, other types of integrated circuits may be used (e.g., Structured/Platform ASICs, FPGAs, and other semi-custom ICs), which may be programmed in any manner known in the art. The functions of each module may also be implemented, in whole or in part, with instructions embodied in a memory, formatted to be executed by general or application-specific processors.

The access point receiver module 810 may receive information such as packets, user data, and/or control information associated with various information channels (e.g., control channels, data channels, etc.). The access point receiver module 810 may receive the messages sent from the wireless station 170 indicating that WLAN transmission bandwidth should be reduced. Information may be passed on to the access point interference mitigation module 815, and to other modules of the device 805.

The access point interference mitigation module 815 may receive messages from wireless stations 170 via the access point receiver module 810 and to respond to the messages by adjusting the WLAN transmissions to the transmitting wireless stations 170 in accordance with the received messages. In particular, the bandwidth of WLAN transmissions sent from the device 805 may be reduced in order to avoid possible interference with scheduled LTE/LTE-A transmissions at the wireless stations 170. The WLAN bandwidths may be reduced on a packet-by-packet basis, and any changes in bandwidth may only occur during a time period identified in the messages sent by the wireless stations 170 or until an updated message is received at the device 805. The reduced WLAN frequencies and the timing of such transmissions may be communicated from the access point interference mitigation module 815 to the access point transmitter module 820 for implementation.

The access point transmitter module 820 may transmit the WLAN transmissions in accordance with the instructions of the access point interference mitigation module 815. In some examples, the access point transmitter module 820 may be collocated with the access point receiver module 810 in a transceiver module.

Figure 9:
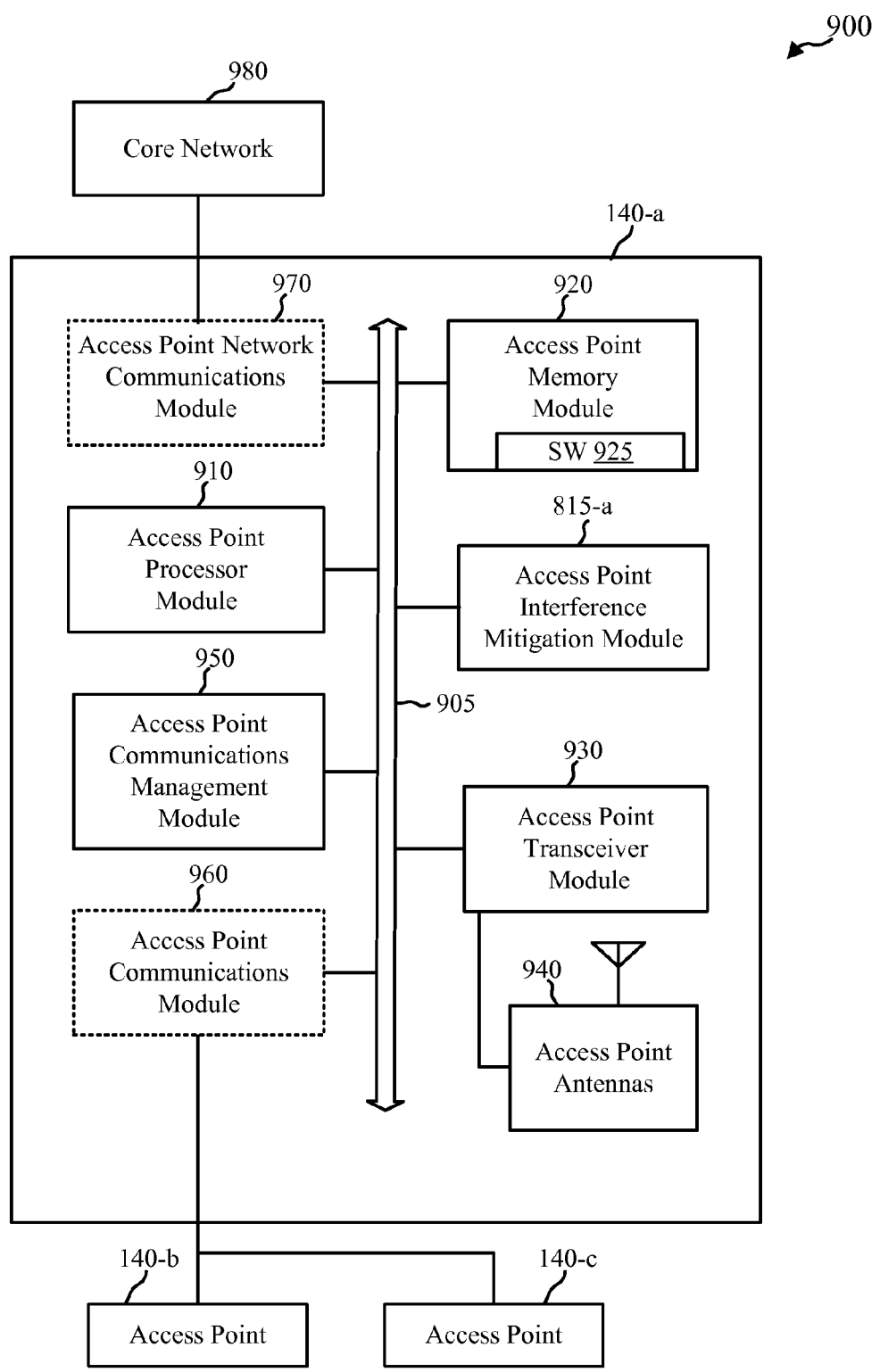
FIG. 9 shows a block diagram of a wireless communication system, in accordance with various aspects of the present disclosure.

Turning to FIG. 9, a diagram 900 is shown that illustrates an access point or AP 140-*a* that may assist in interference mitigation at a wireless station. In some aspects, the access point 140-*a* may be an example of the access points 140 of FIGS. 1 and/or 2. The access point 140-*a* may include an access point processor module 910, an access point memory module 920, an access point transceiver module 930, access point antennas 940, and an access point interference mitigation module 815-*a*. The access point interference mitigation module 815-*a* may be an example of the access point interference mitigation module 815 of FIG. 8. In some examples, the access point 140-*a* may also include one or both of an access point communications module 960 and an access point network communications module 970. Each of these modules may be in communication with each other, directly or indirectly, over at least one bus 905.

The access point memory module 920 may include random access memory (RAM) and read-only memory (ROM). The access point memory module 920 may also store computer-readable, computer-executable software (SW) code 925 containing instructions that, when executed, cause the access point processor module 910 to perform various functions described herein for receiving a message from a wireless station requesting that WLAN transmission bandwidth be reduced and reacting to the message, for example. Alternatively, the software code 925 may not be directly executable by the access point processor module 910 but may cause the computer, e.g., when compiled and executed, to perform functions described herein.

The access point processor module 910 may include an intelligent hardware device, e.g., a central processing unit (CPU), a microcontroller, an ASIC, etc. The access point processor module 910 may process information received through the access point transceiver module 930, the access point communications module 960, and/or the access point network communications module 970. The access point processor module 910 may also process information to be sent to the access point transceiver module 930 for transmission through the access point antennas 940, to the access point communications module 960, and/or to the access point network communications module 970. The access point processor module 910 may handle, alone or in connection with the access point interference mitigation module 815-*a*, various aspects related to receiving and responding to a request from a wireless station to reduce the bandwidth of WLAN transmissions.

The access point transceiver module 930 may include a modem that modulates the packets and provides the modulated packets to the access point antennas 940 for transmission, and demodulates packets received from the access point antennas 940. The access point transceiver module 930 may be implemented as at least one transmitter module and at least one separate receiver module. The access point transceiver module 930 may communicate bi-directionally, via the access point antennas 940, with at least one wireless station 145, 170 as illustrated in FIGS. 1 and/or 2, for example. The access point 140-*a* may typically include multiple access point antennas 940 (e.g., an antenna array). The access point 140-*a* may communicate with a core network 980 through the access point network communications module 970. The access point 140-*a* may communicate with other access points, such as the access point 140-*b* and the access point 140-*c*, using the access point communications module 960.

According to the architecture of FIG. 9, the access point 140-*a* may further include an access point communications management module 950. The access point communications management module 950 may manage communications with stations and/or other devices as illustrated in the network 100 of FIG. 1. The access point communications management module 950 may be in communication with some or all of the other modules of the access point 140-*a* via the bus or buses 905. Alternatively, functionality of the access point communications management module 950 may be implemented as a module of the access point transceiver module 930, as a computer program product, and/or as at least one controller element of the access point processor module 910.

The modules of the access point 140-*a* may implement aspects discussed above with respect FIGS. 1, 2, 4 and/or 8, and those aspects may not be repeated here for the sake of brevity. Moreover, the modules of the access point 140-*a* may implement aspects discussed below with respect to FIG. 13 and those aspects may not be repeated here also for the sake of brevity.

Figure 10:
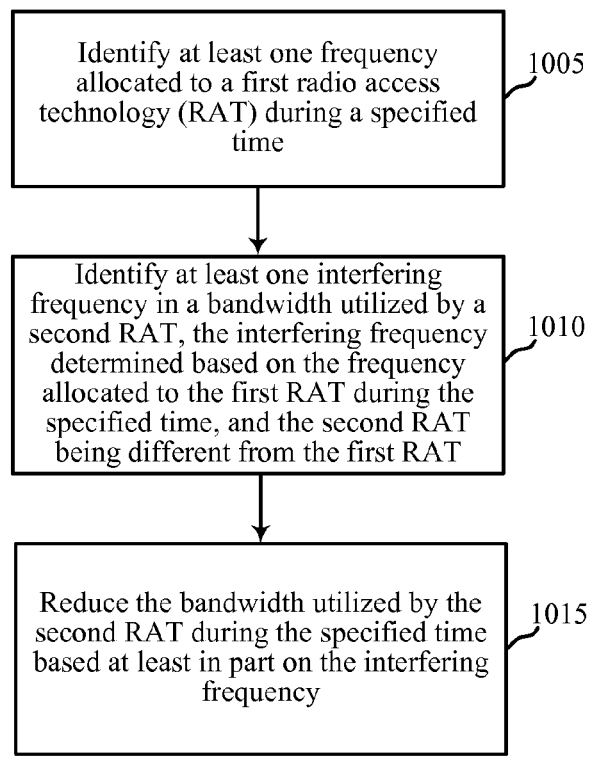
FIGS. 10-12 are flow charts illustrating examples of a method for wireless communications performed by a wireless station, in accordance with various aspects of the present disclosure.

FIG. 10 is a flow chart illustrating an example of a method 1000 for wireless communication, in accordance with various aspects of the present disclosure. For clarity, the method 1000 is described below with reference to aspects of the wireless stations 170 described with reference to FIGS. 1, 2, 3A, 3B, 3C, 4 and/or 7, and/or aspects of the apparatuses 505 described with reference to FIGS. 5 and/or 6. In some examples, a wireless station may execute sets of codes to control the functional elements of the wireless station to perform the functions described below. Additionally or alternatively, the wireless station may perform the functions described below using hardware.

At block 1005, the method 1000 may include identifying at least one frequency allocated to a first radio access technology (RAT) during a specified time. As an example, this could be performed by obtaining LTE/LTE-A scheduling information for the wireless station and determining a frequency to be used in accordance with the scheduling information. Alternatively, the identified first frequency could be a frequency used during reception of a WLAN communication. The operations at block 1005 may be performed using the wireless station interference mitigation module 515 described with reference to FIGS. 5, 6 and/or 7.

At block 1010, the method 1000 may include identifying at least one interfering frequency in a bandwidth utilized by a second RAT, the interfering frequency determined based on the frequency allocated to the first RAT during the specified time, and the second RAT being different from the first RAT. As an example, the second RAT could be implemented in a WLAN and the interfering frequency could be a frequency to be used by the wireless station for WLAN transmissions. Alternatively, the second RAT could be an LTE/LTE-A system and the interfering frequency could be a frequency to be used by the wireless station for LTE/LTE-A transmissions. The operations at block 1010 may be performed using the wireless station interference mitigation module 515 described with reference to FIGS. 5, 6 and/or 7.

At block 1015, the method 1000 may include reducing the bandwidth utilized by the second RAT during the specified time based at least in part on the interfering frequency. As an example, the wireless station could reduce the bandwidth of its WLAN transmissions in order to not interfere with LTE/LTE-A reception. The operations at block 1015 may be performed using the wireless station interference mitigation module 515 described with reference to FIGS. 5, 6 and/or 7.

Thus, the method 1000 may provide for wireless communication incorporating interference mitigation. It should be noted that the method 1000 is just one implementation and that the operations of the method 1000 may be rearranged or otherwise modified such that other implementations are possible.

Figure 11:
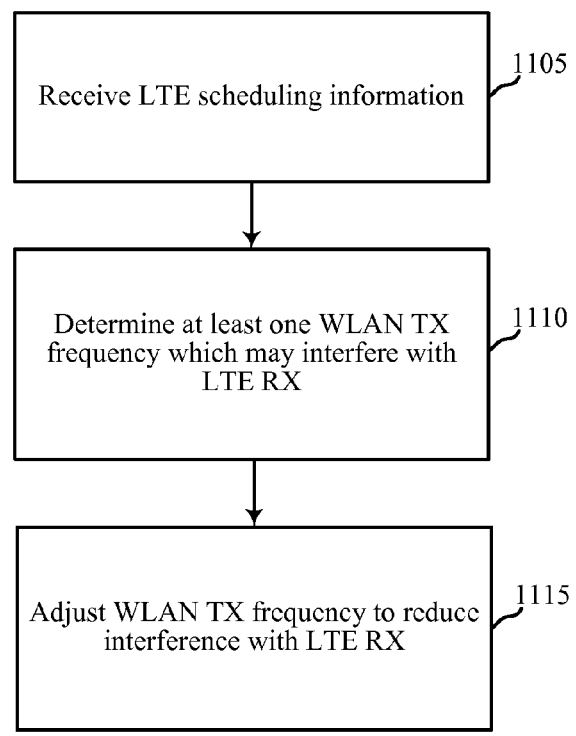

FIG. 11 is a flow chart illustrating an example of a method 1100 for wireless communication, in accordance with various aspects of the present disclosure. For clarity, the method 1100 is described below with reference to aspects of the wireless stations 170 described with reference to FIGS. 1, 2, 3A, 3B, 3C, 4 and/or 7, and/or aspects of the apparatuses 505 described with reference to FIGS. 5 and/or 6. In some examples, a wireless station may execute sets of codes to control the functional elements of the wireless station to perform the functions described below. Additionally or alternatively, the wireless station may perform the functions described below using hardware.

At block 1105, the method 1100 may include receiving LTE/LTE-A scheduling information. The received scheduling information is for the wireless station and may be used by the wireless station to determine frequencies that may be used during both LTE/LTE-A transmissions and/or receptions. The received scheduling information may also be used to determine the timing of the use of the identified frequencies. The operations at block 1105 may be performed using the wireless station interference mitigation module 515 described with reference to FIGS. 5, 6 and/or 7.

At block 1110, the method 1100 may include determining at least one WLAN transmission frequency which may interfere with LTE/LTE-A reception. Once the wireless station is in possession of the LTE/LTE-A scheduling information, the wireless station may compare the frequencies to be used for LTE/LTE-A communications and determine whether any WLAN transmission frequencies may interfere with LTE/LTE-A reception. The operations at block 1110 may be performed using the wireless station interference mitigation module 515 described with reference to FIGS. 5, 6 and/or 7.

At block 1115, the method 1100 may include adjusting WLAN transmission frequencies to reduce interference with LTE/LTE-A reception. If a conflict is identified, the wireless station can adjust the bandwidth used for WLAN transmission on a packet-by-packet basis in order to avoid or reduce the chance of interfering with LTE/LTE-A reception. The operations at block 1115 may be performed using the wireless station interference mitigation module 515 described with reference to FIGS. 5, 6 and/or 7.

Thus, the method 1100 may provide for wireless communication incorporating interference mitigation. It should be noted that the method 1100 is just one implementation and that the operations of the method 1100 may be rearranged or otherwise modified such that other implementations are possible.

Figure 12:
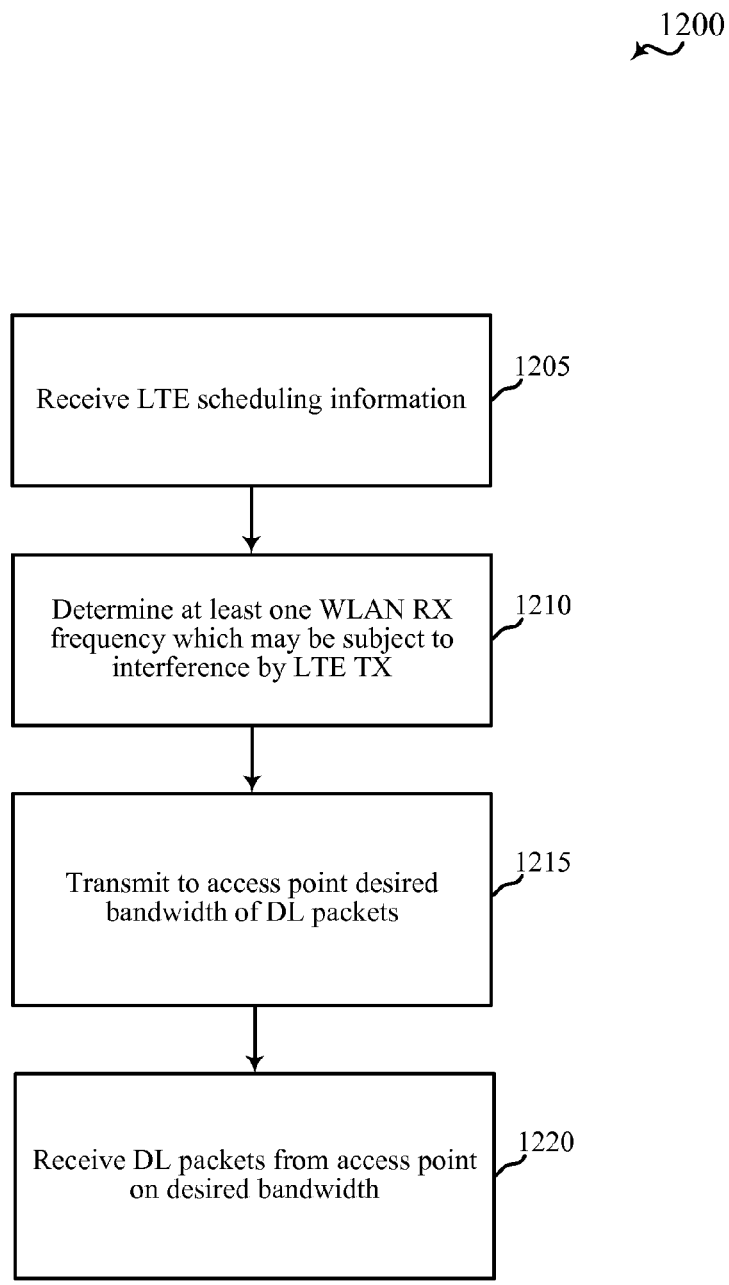

FIG. 12 is a flow chart illustrating an example of a method 1200 for wireless communication, in accordance with various aspects of the present disclosure. For clarity, the method 1200 is described below with reference to aspects of the wireless stations 170 described with reference to FIGS. 1, 2, 3A, 3B, 3C, 4 and/or 7, and/or aspects of the apparatuses 505 described with reference to FIGS. 5 and/or 6. In some examples, a wireless station may execute sets of codes to control the functional elements of the wireless station to perform the functions described below. Additionally or alternatively, the wireless station may perform the functions described below using hardware.

At block 1205, the method 1200 may include receiving LTE/LTE-A scheduling information. The received scheduling information is for the wireless station and may be used by the wireless station to determine frequencies that may be used during both LTE/LTE-A transmissions and/or receptions. The received scheduling information may also be used to determine the timing of the use of the identified frequencies. The operations at block 1205 may be performed using the wireless station interference mitigation module 515 described with reference to FIGS. 5, 6 and/or 7.

At block 1210, the method 1200 may include determining at least one LTE/LTE-A transmission frequency which may interfere with WLAN reception. Once the wireless station is in possession of the LTE/LTE-A scheduling information, the wireless station may compare the frequencies to be used for LTE/LTE-A communications and determine whether any LTE/LTE-A transmission frequencies may interfere with WLAN reception. The operations at block 1210 may be performed using the wireless station interference mitigation module 515 described with reference to FIGS. 5, 6 and/or 7.

At block 1215, the method 1200 may include transmitting to an access point a desired bandwidth of WLAN download packets for the time period in which LTE/LTE-A transmission is scheduled to occur on interfering frequencies. The operations at block 1215 may be performed using the wireless station interference mitigation module 515 described with reference to FIGS. 5, 6 and/or 7.

At block 1220, the method 1200 may include receiving WLAN download packets from the access point on the desired bandwidth. In this case, the access point would have received the transmitted request and responded in accordance with the request. The operations at block 1220 may be performed using at least the wireless station receiver module 510 described with reference to FIGS. 5 and/or 6, and/or the wireless station transceiver module 740 described with reference to FIG. 7.

Thus, the method 1200 may provide for wireless communication incorporating interference mitigation. It should be noted that the method 1200 is just one implementation and that the operations of the method 1200 may be rearranged or otherwise modified such that other implementations are possible.

Figure 13:
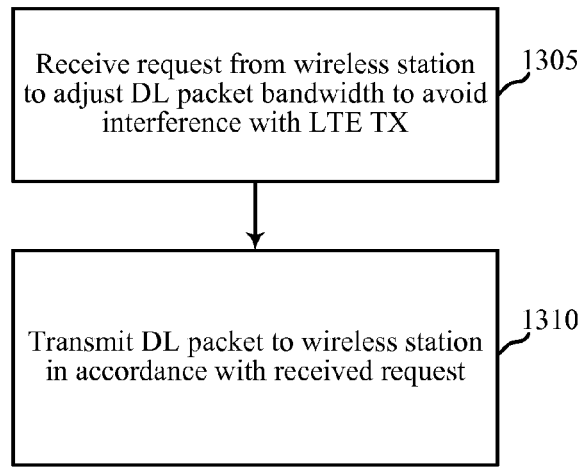
FIG. 13 is a flow chart illustrating an example of a method for wireless communication performed by an access point, in accordance with various aspects of the present disclosure.

FIG. 13 is a flow chart illustrating an example of a method 1300 for wireless communication, in accordance with various aspects of the present disclosure. For clarity, the method 1300 is described below with reference to aspects of the access points 140 described with reference to FIGS. 1, 2, 4 and/or 9, and/or aspects of the devices 805 described with reference to FIG. 8. In some examples, an access point may execute sets of codes to control the functional elements of the access point to perform the functions described below. Additionally or alternatively, the access point may perform the functions described below using hardware.

At block 1305, the method 1300 may include receiving a request from a wireless station to adjust a download packet bandwidth in order to avoid interference with LTE/LTE-A transmissions at the wireless station. The received request may have been generated by the wireless station after the wireless station had received LTE/LTE-A scheduling information and determined that a frequency on which LTE/LTE-A transmissions were scheduled to occur may interfere with WLAN reception. The operations at block 1305 may be performed using the access point interference mitigation module 815 described with reference to FIGS. 8 and/or 9.

At block 1310, the method 1300 may include transmitting download packets to the wireless station in accordance with the received request. Thus, the chance of interference between LTE/LTE-A transmissions and WLAN reception at the wireless station may be reduced. The operations at block 1310 may be performed using at least the access point interference mitigation module 815 described with reference to FIGS. 8 and/or 9.

Thus, the method 1300 may provide for wireless communication incorporating interference mitigation. It should be noted that the method 1300 is just one implementation and that the operations of the method 1300 may be rearranged or otherwise modified such that other implementations are possible.

In some examples, aspects from two or more of the methods 1000, 1100, 1200 and/or 1300 may be combined. It should be noted that the methods 1000, 1100, 1200 and/or 1300 are just example implementations, and that the operations of the methods 1000, 1100, 1200 and/or 1300 may be rearranged or otherwise modified such that other implementations are possible.

The detailed description set forth above in connection with the appended drawings describes examples and does not represent the only examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an ASIC, an FPGA or other programmable logic device, discrete gate or transistor logic, discrete hardware modules, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing modules A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method of wireless communication, comprising:
   identifying at least one frequency allocated to a first radio access technology (RAT) during a specified time;
   identifying at least one interfering frequency in a bandwidth utilized by a second RAT, the interfering frequency determined based on the frequency allocated to the first RAT during the specified time, and the second RAT being different from the first RAT;
   determining at least one predefined bandwidth increment of the bandwidth used by the second RAT that includes the interfering frequency; and
   reducing the bandwidth utilized by the second RAT during the specified time by disabling utilization of the at least one predefined bandwidth increment that includes the interfering frequency.

2. The method of claim 1, wherein the first RAT is a Long Term Evolution (LTE) RAT, and the second RAT is a Wireless Local Area Network (WLAN) RAT.

3. The method of claim 2, wherein the frequency allocated to the first RAT during the specified time is utilized for an LTE uplink.

4. The method of claim 3, further comprising:
   receiving LTE uplink scheduling information.

5. The method of claim 2, wherein the second RAT transmits at least one packet over the reduced bandwidth during the specified time.

6. The method of claim 2, wherein the interfering frequency desensitizes an LTE downlink of the first RAT.

7. The method of claim 1, wherein the predefined bandwidth increments include 20, 40, 80, and 160 MHz bandwidth increments.

8. The method of claim 1, further comprising:
   transmitting interfering frequency information to an access point based at least in part on the determined interfering frequency; and
   receiving a transmission from the access point during the specified time, the transmission utilizing a reduced bandwidth determined by the interfering frequency information.

9. An apparatus for wireless communication, comprising:
   at least one processor; and
   a memory coupled to the at least one processor, wherein the at least one processor is configured to use instructions in the memory to:
      identify, with an interference identifier, at least one frequency allocated to a first radio access technology (RAT) during a specified time, and to identify at least one interfering frequency in a bandwidth utilized by a second RAT, the interfering frequency determined based on the frequency allocated to the first RAT during the specified time, and the second RAT being different from the first RAT;
      determine, with an interference mitigator, at least one predefined bandwidth increment of the bandwidth used by the second RAT that includes the interfering frequency; and
      reduce, with the interference mitigator, the bandwidth utilized by the second RAT during the specified time by disabling utilization of the predefined bandwidth increment that includes the interfering frequency.

10. The apparatus of claim 9, wherein the first RAT is a Long Term Evolution (LTE) RAT, and the second RAT is a Wireless Local Area Network (WLAN) RAT.

11. The apparatus of claim 10, further comprising:
a transmitter to use the frequency allocated to the first RAT during the specified time for an LTE uplink.

12. The apparatus of claim 11, further comprising:
a receiver to receive LTE uplink scheduling information.

13. The apparatus of claim 10, further comprising:
a transmitter to transmit, using the second RAT, at least one packet over the reduced bandwidth during the specified time.

14. The apparatus of claim 9, further comprising:
a transmitter to transmit interfering frequency information to an access point based at least in part on the determined interfering frequency; and
a receiver to receive a transmission from the access point during the specified time, the transmission utilizing a reduced bandwidth determined by the interfering frequency information.

15. An apparatus for wireless communication, comprising:
means for identifying at least one frequency allocated to a first radio access technology (RAT) during a specified time;
means for identifying at least one interfering frequency in a bandwidth utilized by a second RAT, the interfering frequency determined based on the frequency allocated to the first RAT during the specified time, and the second RAT being different from the first RAT;
means for determining at least one predefined bandwidth increment of the bandwidth used by the second RAT that includes the interfering frequency; and
means for reducing the bandwidth utilized by the second RAT during the specified time by disabling utilization of the at least one predefined bandwidth increment that includes the interfering frequency.

16. The apparatus of claim 15, wherein the first RAT is a Long Term Evolution (LTE) RAT, and the second RAT is a Wireless Local Area Network (WLAN) RAT.

17. The apparatus of claim 16, further comprising:
means for using the frequency allocated to the first RAT during the specified time for an LTE uplink.

18. The apparatus of claim 17, further comprising:
means for receiving LTE uplink scheduling information.

19. The apparatus of claim 16, further comprising:
means for transmitting, using the second RAT, at least one packet over the reduced bandwidth during the specified time.

20. The apparatus of claim 15, further comprising:
means for transmitting interfering frequency information to an access point based at least in part on the determined interfering frequency; and
means for receiving a transmission from the access point during the specified time, the transmission utilizing a reduced bandwidth determined by the interfering frequency information.

21. A non-transitory computer-readable medium storing computer-executable code for wireless communication, the code executable by a processor to:
identify at least one frequency allocated to a first radio access technology (RAT) during a specified time;
identify at least one interfering frequency in a bandwidth utilized by a second RAT, the interfering frequency determined based on the frequency allocated to the first RAT during the specified time, and the second RAT being different from the first RAT;
determine at least one predefined bandwidth increment of the bandwidth used by the second RAT that includes the interfering frequency; and
reduce the bandwidth utilized by the second RAT during the specified time by disabling utilization of the at least one predefined bandwidth increment that includes the interfering frequency.

22. The computer-readable medium of claim 21, wherein the first RAT is a Long Term Evolution (LTE) RAT, and the second RAT is a Wireless Local Area Network (WLAN) RAT.

23. The computer-readable medium of claim 22, the code being further executable by a processor to:
use the frequency allocated to the first RAT during the specified time for an LTE uplink.

24. The computer-readable medium of claim 22, the code being further executable by a processor to:
transmit, using the second RAT, at least one packet over the reduced bandwidth during the specified time.

25. The computer-readable medium of claim 21, the code being further executable by a processor to:
transmit interfering frequency information to an access point based at least in part on the determined interfering frequency; and
receive a transmission from the access point during the specified time, the transmission utilizing a reduced bandwidth determined by the interfering frequency information.

* * * * *